(12) United States Patent
Garlapati et al.

(10) Patent No.: US 9,601,965 B2
(45) Date of Patent: Mar. 21, 2017

(54) SYSTEMS AND METHODS FOR ISOLATING A CONDUIT ENCLOSURE FOR AN EXPLOSION PROOF MOTOR

(71) Applicant: General Electric Company, Schenectady, NY (US)

(72) Inventors: Praveen Kumar Garlapati, Hyderabad (IN); Sachin Vitthal Mahajan, Hyderabad (IN); Sasidharan Nair, Hyderabad (IN)

(73) Assignee: General Electric Company, Schenectady, NY (US)

( * ) Notice: Subject to any disclaimer, the term of this patent is extended or adjusted under 35 U.S.C. 154(b) by 724 days.

(21) Appl. No.: 13/840,801

(22) Filed: Mar. 15, 2013

(65) Prior Publication Data

US 2014/0265681 A1 Sep. 18, 2014

(51) Int. Cl.
*H02K 5/22* (2006.01)
*H02K 5/136* (2006.01)
*H02K 15/14* (2006.01)

(52) U.S. Cl.
CPC ............. *H02K 5/136* (2013.01); *H02K 5/225* (2013.01); *H02K 15/14* (2013.01); *Y10T 29/49826* (2015.01)

(58) Field of Classification Search
CPC ................................ H02K 5/136; H02K 5/225
USPC ............................................................ 310/89
See application file for complete search history.

(56) References Cited

U.S. PATENT DOCUMENTS

| | | | |
|---|---|---|---|
| 1,799,071 A * | 3/1931 | Smith | 310/88 |
| 2,512,136 A * | 6/1950 | Brown | 310/57 |
| 2,692,373 A | 10/1954 | Werner et al. | |
| 2,778,904 A * | 1/1957 | Jacobi | 200/293 |
| 3,153,695 A | 10/1964 | Hill et al. | |
| 3,739,128 A | 6/1973 | Kaesser et al. | |
| 3,761,601 A | 9/1973 | Kaesser et al. | |
| 3,772,453 A * | 11/1973 | O'Brien | 174/657 |
| 3,779,078 A | 12/1973 | Kaesser et al. | |
| 5,304,880 A * | 4/1994 | Hisada et al. | 310/71 |

(Continued)

FOREIGN PATENT DOCUMENTS

| | | | | |
|---|---|---|---|---|
| EP | 1096614 A2 * | 5/2001 | ........... | H01R 13/527 |
| GB | 1031353 * | 6/1966 | ............... | H02K 5/12 |

OTHER PUBLICATIONS

Machine translation of EP 1096614 A2.*

*Primary Examiner* — Terrance Kenerly

(74) *Attorney, Agent, or Firm* — Armstrong Teasdale LLP

(57) ABSTRACT

An enclosure system for isolating a conduit enclosure for an explosion proof motor is provided. The enclosure system includes a stator enclosure defining a first enclosure opening. The enclosure system also includes a conduit enclosure coupled to the stator enclosure. The conduit enclosure comprises at least one side wall, a rear wall coupled to the side wall, and an interior cavity. The rear wall defines a first entry port having a first volume. The enclosure system further includes at least one electrical lead. The at least one electrical lead extends through the first enclosure opening, through the first entry port, and into the interior cavity. The at least one electrical lead occupies a portion of the first volume and leaves a remaining volume. The enclosure system also includes sealing compound. The sealing compound is coupled with the first entry port such that substantially all of the remaining volume is occupied.

17 Claims, 11 Drawing Sheets

(56) References Cited

U.S. PATENT DOCUMENTS

| | | | |
|---|---|---|---|
| 5,412,272 A * | 5/1995 | Mensching | 310/88 |
| 5,872,410 A * | 2/1999 | Sudoff | 310/68 R |
| 5,889,343 A | 3/1999 | Bryant et al. | |
| 5,949,167 A * | 9/1999 | Blalock et al. | 310/71 |
| 7,012,191 B1 | 3/2006 | Watanabe et al. | |
| 7,288,719 B2 | 10/2007 | Barnhard et al. | |
| 8,120,217 B2 | 2/2012 | Yawata et al. | |
| 8,227,947 B2 | 7/2012 | Oleson et al. | |
| 2004/0072474 A1* | 4/2004 | Nyblin et al. | 439/709 |
| 2006/0066162 A1 | 3/2006 | Woodson | |
| 2009/0322169 A1* | 12/2009 | Moody | 310/89 |
| 2011/0031830 A1 | 2/2011 | Oleson et al. | |
| 2011/0108085 A1 | 5/2011 | Quiter | |

\* cited by examiner

SYSTEMS AND METHODS FOR ISOLATING A CONDUIT ENCLOSURE FOR AN EXPLOSION PROOF MOTOR

BACKGROUND

The field of the invention relates generally to explosion proof motors and, more specifically, to systems and methods for isolating a conduit enclosure attached to an explosion proof motor.

The National Fire Protection Association (NFPA) defines an explosion proof apparatus as, an "[a]pparatus enclosed in a case that is capable of withstanding an explosion of a specific gas or vapor that may occur within it and of preventing the ignition of a specified gas or vapor surrounding the enclosure by sparks, flashes, or explosion of the gas or vapor within, and that operates at such an external temperature that a surrounding flammable atmosphere will not be ignited thereby." The explosion proof designation does not ensure that an apparatus is incapable of exploding, but rather that the apparatus is capable of withstanding an explosion without causing damage to the immediate surroundings of the apparatus beyond a certain level.

Explosion proof motors are a class of motors that are constructed to contain an explosion, as well as to prevent the release of gases. Motors regularly include a conduit enclosure, through which electrical leads pass from the motor. For explosion proof motors, the pathways for the electrical leads represent potential paths for explosive flames, forces, and gases. At least some known motors seal the electrical lead pathways from motor to conduit enclosure to contain an explosion within the motor body.

At least some known methods of isolating a conduit enclosure for an explosion proof motor use slow-curing sealing compounds that are poured into molds within the motor's stator assembly. The motor's electrical leads extend through an opening, and packing material insulation sheets are used to isolate an area within the motor stator in which the sealing compound is poured. However, in such motors, the sealing compound must be applied to a large area, which increases the costs and time to manufacture such motors. Moreover, errors during the sealing process may cause the entire motor's stator to be rendered unusable, thus leading to additional manufacturing expenses.

BRIEF DESCRIPTION

In one aspect, an enclosure system is provided. The enclosure system includes a stator enclosure defining a first enclosure opening. The enclosure system also includes a conduit enclosure coupled to the stator enclosure. The conduit enclosure comprises at least one side wall, a rear wall coupled to the side wall, and an interior cavity. The rear wall defines a first entry port having a first volume. The enclosure system further includes at least one electrical lead. The at least one electrical lead extends through the first enclosure opening, through the first entry port, and into the interior cavity. The at least one electrical lead occupies a portion of the first volume and leaves a remaining volume. The enclosure system also includes sealing compound. The sealing compound is coupled with the first entry port such that substantially all of the remaining volume is occupied.

In a further aspect, a method of coupling a conduit enclosure to a stator enclosure is provided. The method includes providing a conduit enclosure including a terminal connection block, an interior cavity, at least one side wall, and a rear wall coupled to the at least one side wall, the rear wall defining an entry port having a first volume. The method also includes extending at least one electrical lead from the stator enclosure through the entry port into the interior cavity. The at least one electrical lead occupies a portion of the first volume and leaves a remaining volume. The method further includes coupling sealing compound with the entry port such that the sealing compound substantially fills the remaining volume. The method also includes coupling the conduit enclosure to the stator enclosure.

In yet another aspect, an enclosure system is provided. The enclosure system includes a stator enclosure defining a first enclosure opening. The enclosure system also includes a conduit enclosure coupled to said stator enclosure. The conduit enclosure includes a base member having an interior cavity, at least one side wall, and a rear wall coupled to the at least one side wall. The rear wall defines a first entry port. The conduit enclosure also includes a mounting frame. The mounting frame includes a first support and a second support each coupled to the rear wall. The mounting frame also includes a base platform coupled to the first support and the second support. The base platform has an inner-facing surface and a rear-facing surface. The rear-facing surface, the first support, the second support, the rear wall, and the first entry port define a channel having a channel volume. The conduit enclosure further includes a terminal connection block coupled to the mounting frame and having at least one terminal. The enclosure system further includes at least one electrical lead extending from the stator enclosure through the first entry port, through the channel, and into the interior cavity. The at least one electrical lead occupies some of the channel volume and leaves a remaining channel volume. The enclosure system also includes sealing compound coupled with the channel such that the sealing compound fills a portion of the remaining channel volume.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Unless otherwise indicated, the drawings provided herein are meant to illustrate inventive features of the invention. The inventive features are believed to be applicable in a wide variety of systems including one or more embodiments of the invention. As such, the drawings are not meant to include all conventional features known by those of ordinary skill in the art to be required for the practice of the invention.

DETAILED DESCRIPTION

In the following specification, reference will be made to a number of terms, which shall be defined to have the following meanings. The singular forms "a", "an", and "the" include plural references unless the context clearly dictates otherwise. "Optional" or "optionally" means that the subsequently described event or circumstance may or may not occur, and that the description includes instances where the event occurs and instances where it does not. Moreover, approximating language, as used herein throughout the specification and claims, may be applied to modify any quantitative representation that may permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
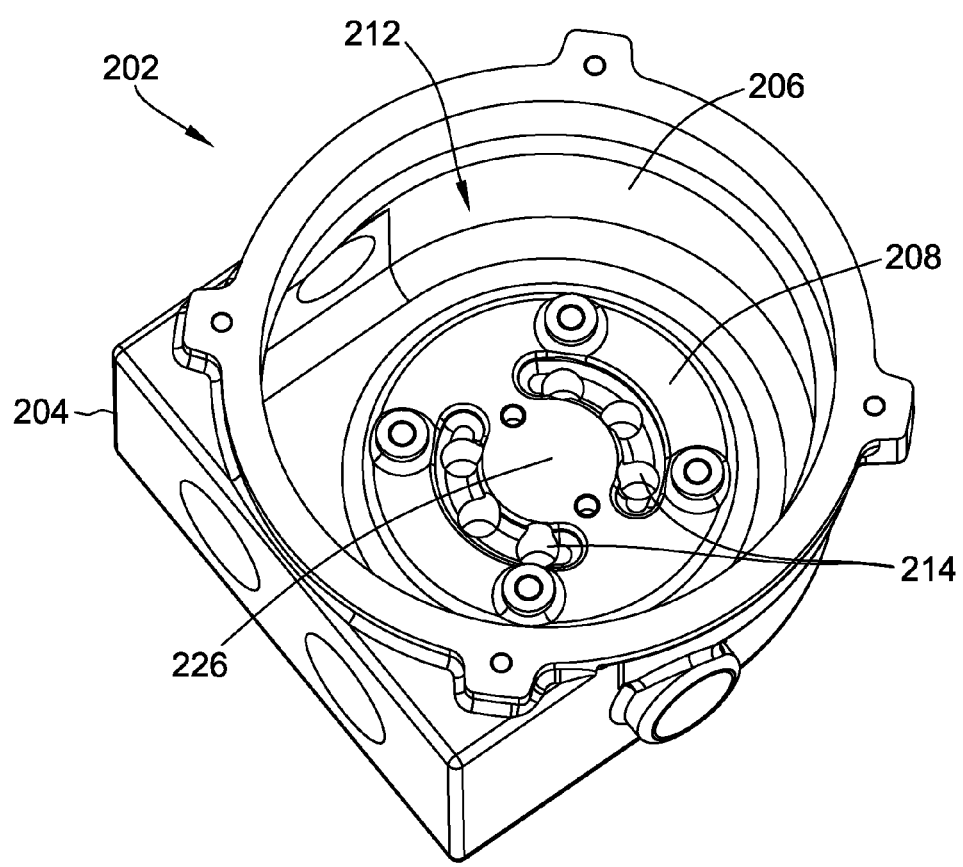
FIG. 1 is a schematic view of an exemplary conduit enclosure that may couple to an electric motor stator.
Figure 2:
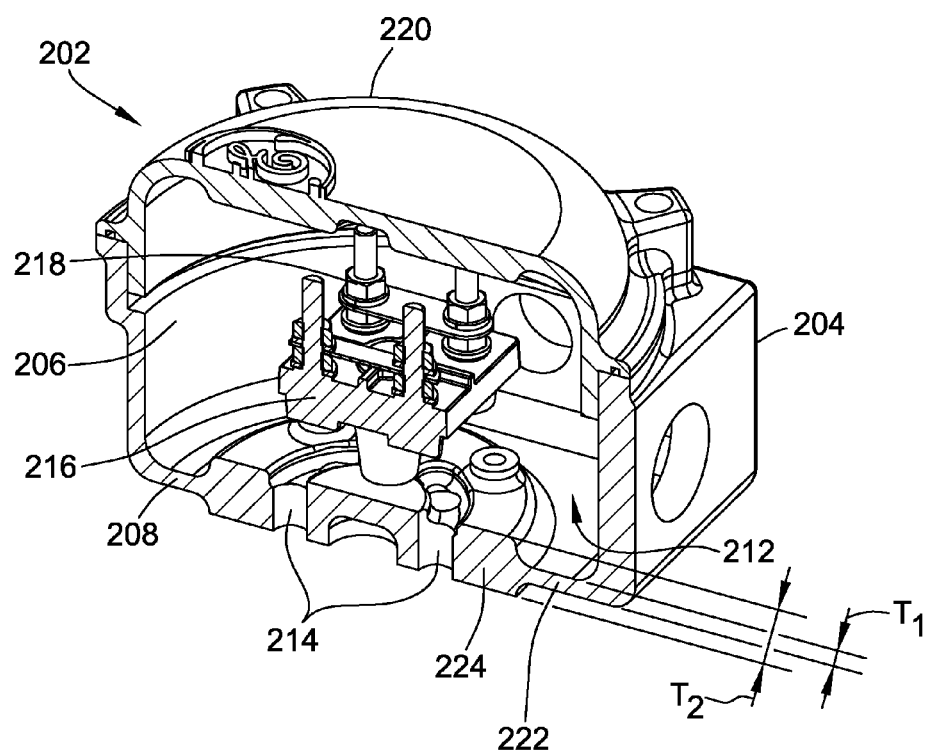
FIG. 2 is a cross-sectional view of the conduit enclosure shown in FIG. 1.
Figure 11:
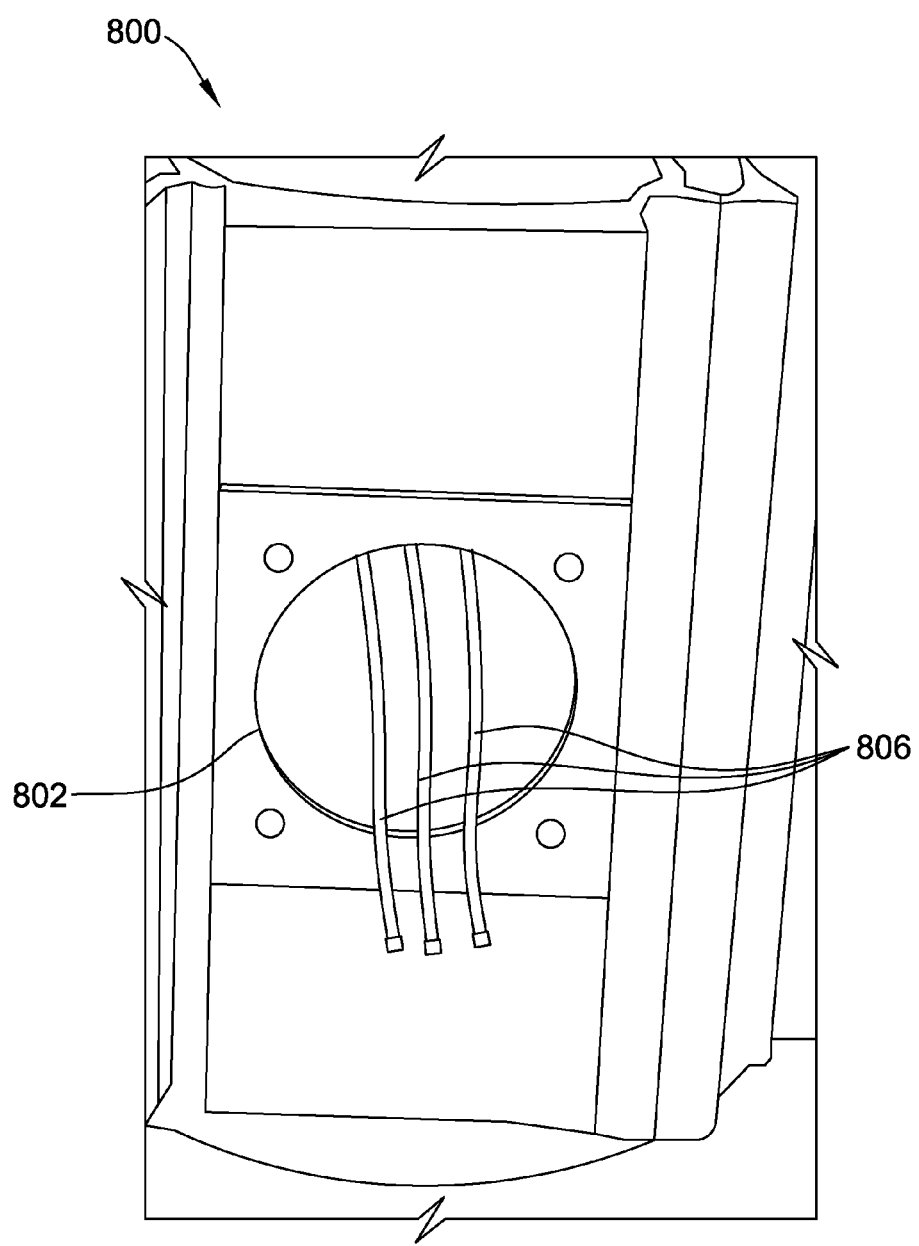
FIG. 11 is a front view of a portion of a stator enclosure defining an enclosure opening.

FIG. 1 is a schematic view of an exemplary conduit enclosure 202 that may couple to an electric motor stator, in particular, an electric motor stator enclosure shown in FIG. 11). FIG. 2 is a cross-sectional view of conduit enclosure 202. In the exemplary embodiment, conduit enclosure 202 includes a base member 204 that includes at least one side wall 206 and a rear wall 208. Rear wall 208 includes one or more entry ports 214 that each have an interior volume defined therein. Alternatively, entry ports 214 may be defined in any wall of conduit enclosure 202, such as, without limitation, side wall 206, that enables conduit enclosure 202 to function as described herein. In the exemplary embodiment, entry ports 214 are cylindrical, and are spaced circumferentially about a center 226. In some embodiments, rear wall 208 may include a first area 222 having a thickness, $T_1$, and a second area 224 having a thickness, $T_2$, that is thicker than first area 222. Entry ports 214 entry ports 214 are defined within second area 224. Base member 204 has an interior cavity 212 defined therein that may be capped with a cover member 220. Base member 204 also includes a terminal connection block 216 that includes at least one terminal 218, and that may be coupled to rear wall 208.

During assembly, in the exemplary embodiment, one or more electric leads (not shown) from an electric motor stator (not shown) are routed through entry port 214 into interior cavity 212 of conduit enclosure 202. Each electric lead occupies only a portion of the volume defined within entry port 214. Sealing compound is injected into entry port 214 such that the remaining volume of entry port 214 adjacent to each electric lead is substantially filled and such that seal entry port 214 is substantially sealed. Base member 204 is then coupled to the electric motor stator. Alternatively, base member 204 may be coupled to the electric motor stator prior to injecting sealing compound into entry port 214. In the exemplary embodiment, sealing compound may be any material that can be formed into a volume of a passage, and that forms an explosion resistant seal upon curing. For example, in one embodiment, the sealing compound is "Chico® A", made available by Cooper Crouse-Hinds of Syracuse, N.Y. Chico® is a registered trademark of Cooper Crouse-Hinds.

Figure 3:
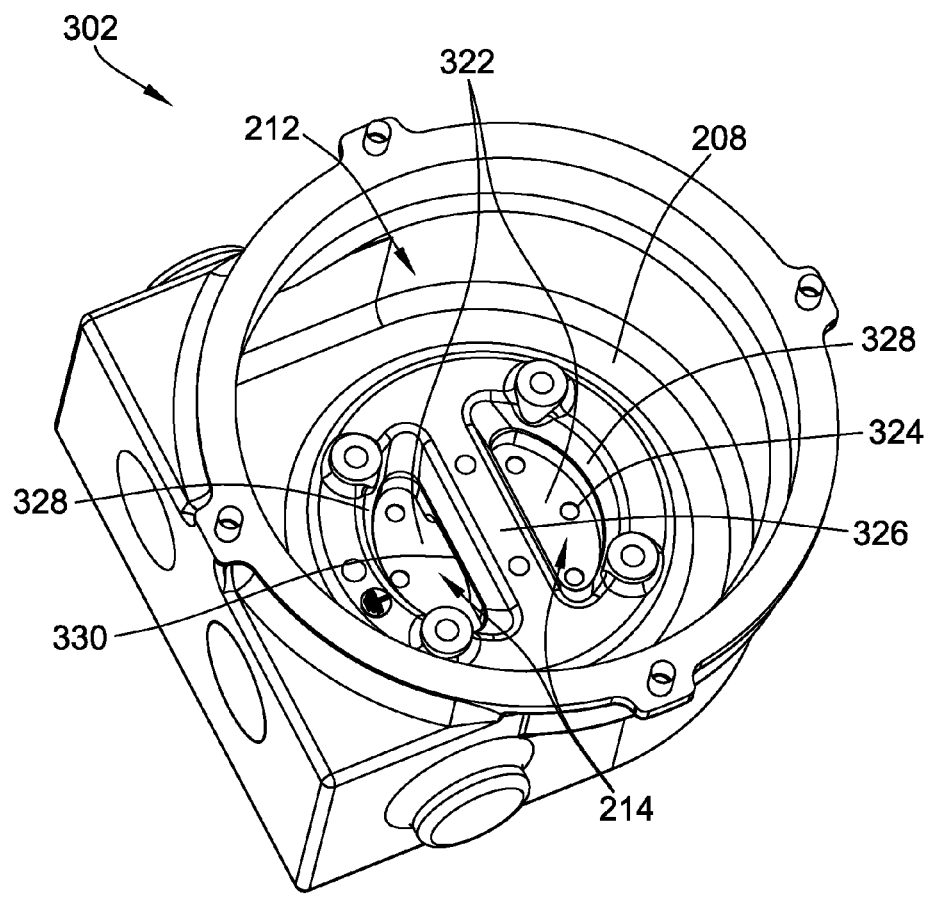
FIG. 3 is a schematic view of an alternative conduit enclosure that may couple to an electric motor stator.

FIG. 3 is a schematic view of an exemplary conduit enclosure 302 that may couple to an electric motor stator (not shown). Enclosure 302 is similar to enclosure 202 (shown in FIGS. 1 and 2) and identical components are identified in FIG. 3 using the same reference numbers used in FIGS. 1 and 2. In the exemplary embodiment, conduit enclosure 302 includes a rear wall 208 having two semi-circular entry ports 214 that are separated by a crossbar 326. A tapered ridge 328 in rear wall 208 surrounds each entry port 214. A slot 330 beneath crossbar 326 connects the entry ports 214. Further, each entry port 214 is covered by insulating paper 322 that is coupled to an outer surface of rear wall 208. Alternatively, insulating paper 322 may be coupled to an inner surface of rear wall 208. Insulating paper 322 includes one or more electrical lead holes 324 defined therein. For example, in one embodiment, insulating paper 322 is "Nomex® Type 410" insulation paper with a 0.02" thickness, made available by DuPont of Wilmington, Delaware. Nomex® is a registered trademark of DuPont.

During assembly, in the exemplary embodiment, insulating paper 322 is coupled to rear wall 208 such that electrical lead hole 324 defined in insulating paper 322 is substantially concentrically aligned with entry port 214. One or more electric leads (not shown) from the electric motor stator are extended through each electrical lead hole 324 and through entry port 214 into enclosure interior cavity 212. Sealing compound is injected into entry port 214 such that the remaining volume of entry port 214 adjacent to electric lead is substantially filled and such that entry port 214 is substantially sealed. Insulating paper 322 restrains sealing compound during application and curing by bordering one side of entry port 214. Tapered ridge 328 provides support for the sealing compound to assist withstanding the pressure from an internal explosion within conduit box 302, thereby preventing solid sealing compound from dislocation. Slot 330 assists during application of sealing compound, and further serves as a support to the sealing compound from an explosion within the motor stator (not shown).

Figure 4:
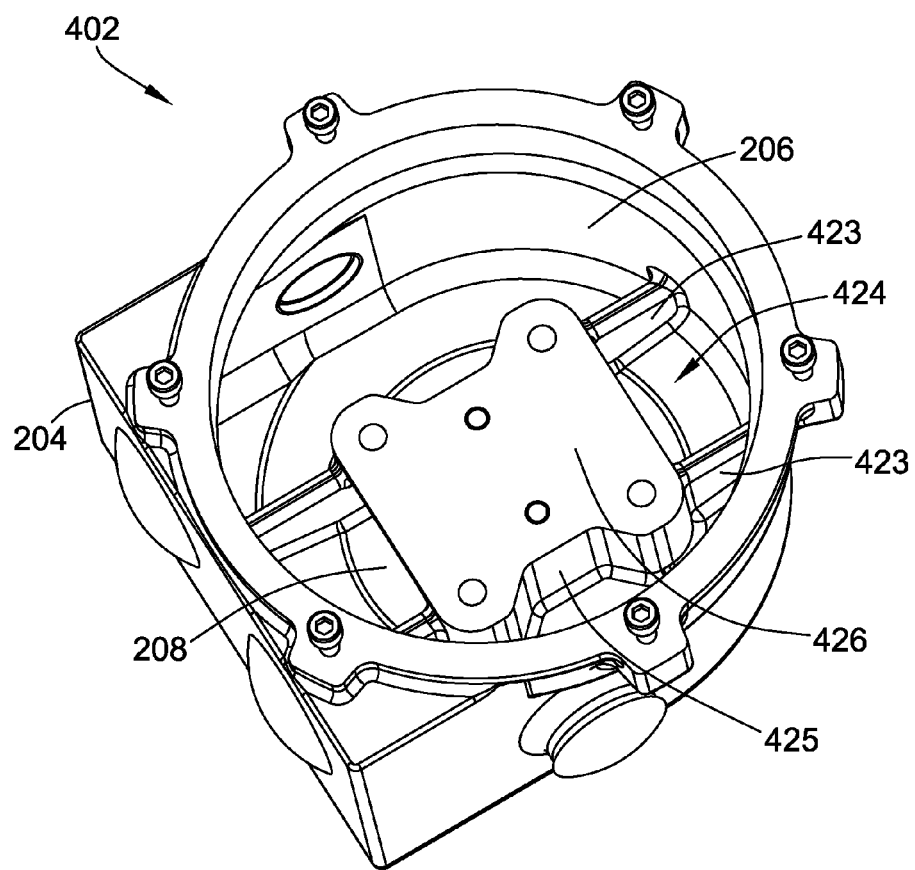
FIG. 4 is a schematic view of another alternative enclosure that may couple to an electric motor stator.
Figure 5:
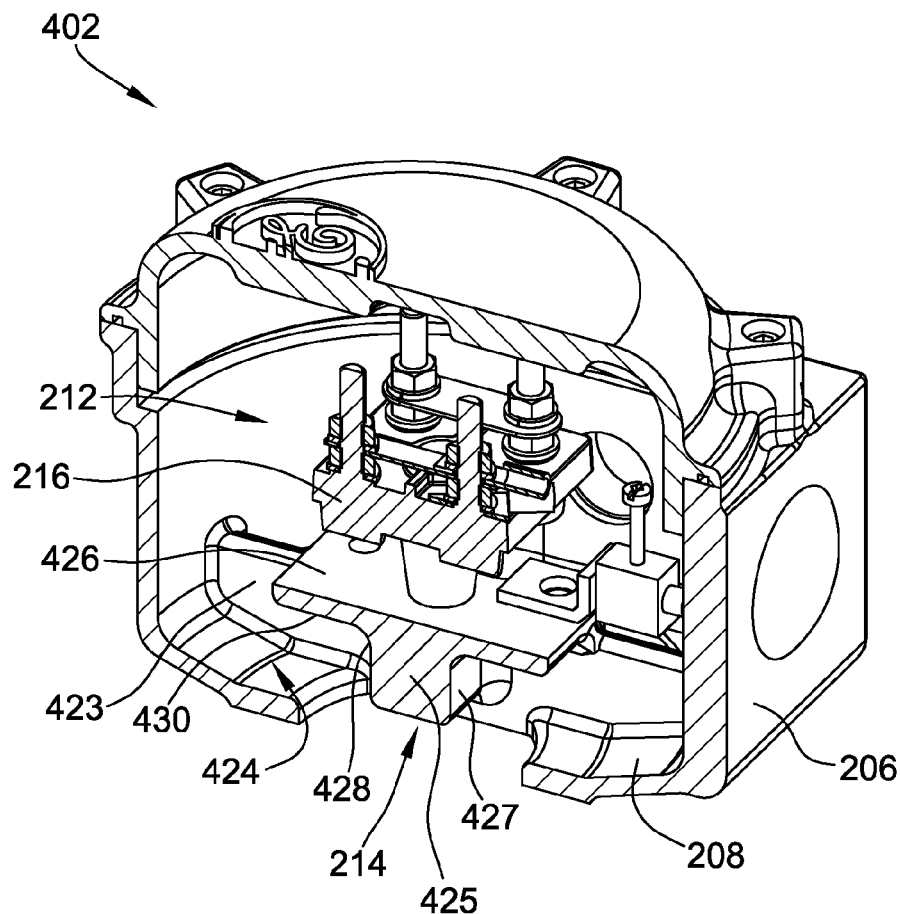
FIG. 5 is a cross-sectional view of the conduit enclosure shown in FIG. 4.

FIG. 4 is a schematic view of another exemplary embodiment of a conduit enclosure 402 that may couple to an electric motor stator (not shown). FIG. 5 is a cross-sectional view of conduit enclosure 402. Enclosure 402 is similar to enclosure 202 (shown in FIGS. 1 and 2) and identical components are identified in FIGS. 4 and 5 using the same reference numbers used in FIGS. 1 and 2. In the exemplary embodiment, conduit enclosure 402 includes two supports 423 coupled to rear wall 208. In some embodiments, supports 423 may also be coupled to side wall 206. A mounting frame 425 is coupled to supports 423. Mounting frame 425 may have a terminal connection block 216 mounted to a base platform 426. Mounting frame 425 includes a rear surface 430. In some embodiments, mounting frame 425 includes a lateral support 427 which, along with rear surface 430, forms a curved transition surface 428. Rear wall 208 defines an entry port 214. A channel 424 is defined between supports 423, by rear wall 208, and by mounting frame 425.

During assembly, in the exemplary embodiment, one or more electric leads (not shown) from an electric motor stator are extended through entry port 214, through channel 424, and into interior cavity 212 of conduit enclosure 402. Sealing compound is injected into channel 424 such that at least some of the remaining volume of channel 424 adjacent to each electric lead is filled such that channel 424 is substantially sealed. In some embodiments, channel 424 may be substantially completely filled with sealing compound. In other embodiments, insulating paper, such as insulating paper 322 (shown in FIG. 3), may be used to border entry port 214 to contain sealing compound during application and curing. In operation, in some embodiments, mounting frame 425 is substantially supported by lateral support 427, and by coupling mounting frame 425 to supports 423. Sealing compound is supported by rear surface 430 during an explosion in the motor stator (not shown), and further supported by rear surface 208 during an explosion within conduit enclosure 402.

Figure 6:
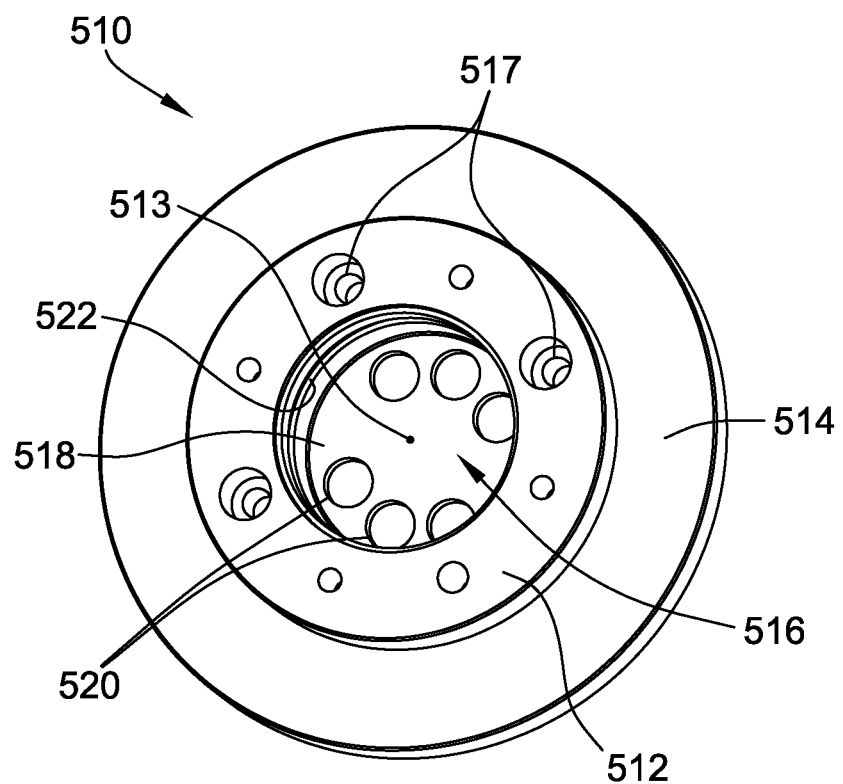
FIG. 6 is a schematic view of an exemplary adapter that may be used to couple to an electric motor stator and to a conduit enclosure.

FIG. 6 is a schematic view of an exemplary adapter 510 that may be used to couple an electric motor stator (not shown) to a conduit enclosure (not shown in FIG. 6). In the exemplary embodiment, adapter 510 includes a center region 512 and an outer region 514. Center region 512 includes mounting holes 517 defined therein that may be used to couple adapter 510 to either the conduit enclosure, or to the electric motor stator, or to both. Center region 512 also includes a center cavity 516 that includes a volume defined therein. Center cavity 516 is bordered by a rear plate 518 that includes a plurality of entry ports 520 defined therein. In the exemplary embodiment, center cavity 516 is substantially circular, and includes a cylindrical volume defined therein. Alternatively, center cavity 516 may have any shape that enables adapter 510 to function as described herein. In the exemplary embodiment, there are six circular entry ports 520 spaced circumferentially about a center 513 of rear plate 518. Alternatively, adapter 510 may include any number, orientation, and shape of entry ports 520 that enables adapter 510 to function as described herein. Grooves 522 are provided along an interior wall of center cavity 516. In operation, grooves 522 assist in retaining the sealing compound inside center cavity 516.

Figure 7:
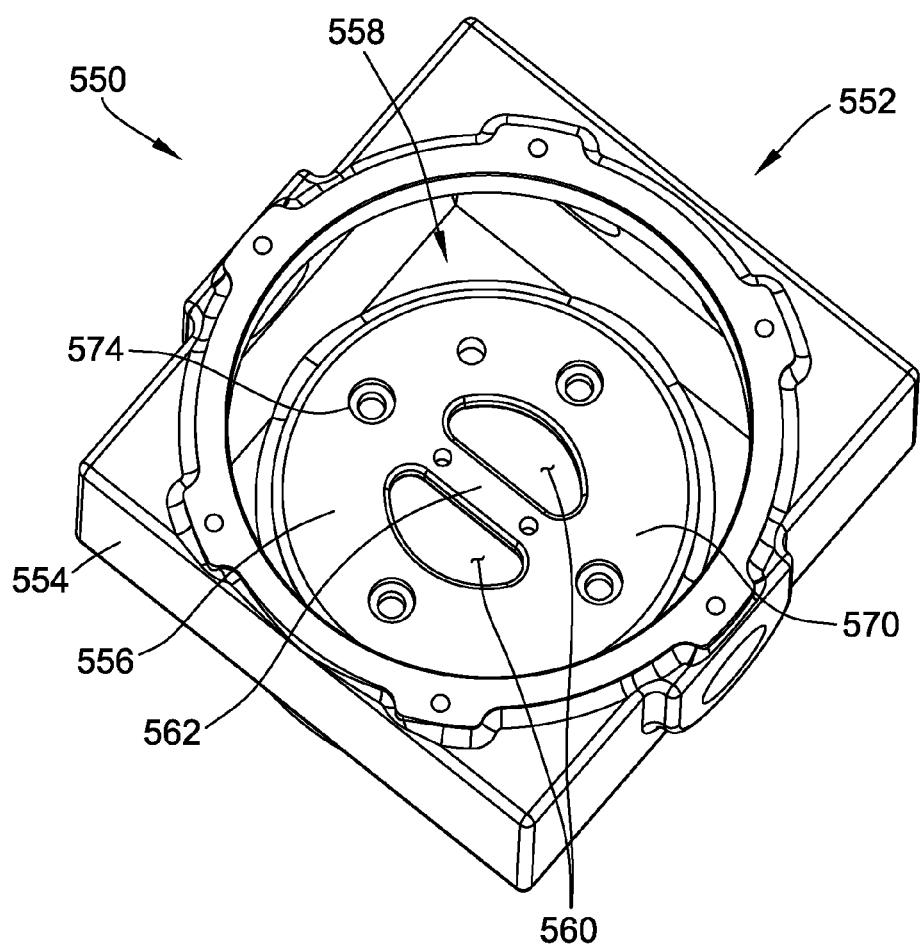
FIG. 7 is a schematic view of a further alternative conduit enclosure that may couple to the adapter shown in FIG. 6.

FIG. 7 is a schematic view of an exemplary conduit enclosure 550 that may couple to adapter 510 (shown in FIG. 6). In the exemplary embodiment, conduit enclosure 550 includes a base member 552 that includes at least one side wall 554 and a rear wall 556. Rear wall 556 includes one or more enclosure entry ports 560 defined therein. Alternatively, enclosure entry ports 560 may be defined in any wall of conduit enclosure 550, such as, without limitation, side wall 554, that enables conduit enclosure 550 to function as described herein. In the exemplary embodiment, enclosure entry ports 560 have a partially semi-circular shape, and are separated by a crossbar 562. Alternatively, conduit enclosure 550 may include any number, orientation, and shape of enclosure entry ports 560 that enables adapter 510 and conduit enclosure 550 to function as described herein. Enclosure entry ports 560 are defined within second area 570. Rear wall 556 also includes mounting holes 574 that may be used to couple conduit enclosure 550 to adapter 510, or to electric motor stator (not shown), or to both. Base member 552 has an interior cavity 558 defined therein that may be capped with a cover member (not shown). Base member 552 may also include a terminal connection block (not shown) that includes at least one terminal (not shown), and that may be coupled to rear wall 556 of base member 552.

Figure 8:
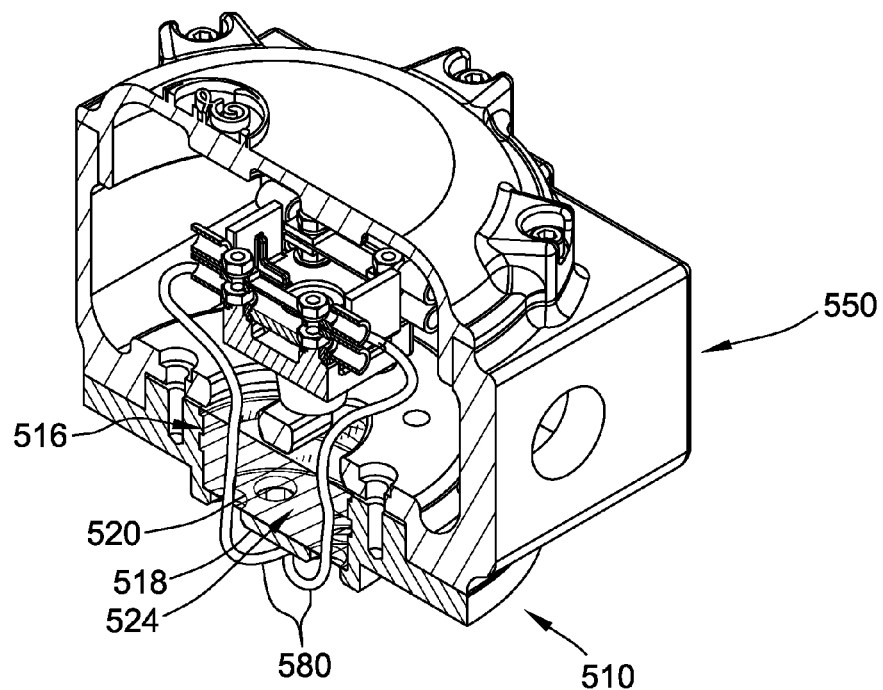
FIG. 8 is a cross-sectional view of the adapter shown in FIG. 6 and the conduit enclosure shown in FIG. 7 shown in an exemplary coupled configuration.

FIG. 8 is a cross-sectional view of adapter 510 and conduit enclosure 550. During assembly, in the exemplary embodiment, adapter 510 is coupled to conduit enclosure 550. Alternatively, adapter 510 may initially be coupled to an electric motor stator (not shown), and then coupled to conduit enclosure 550. Electric leads 580 are extended from the electric motor stator through entry port 520, through enclosure entry port 560 (shown in FIG. 7), and into conduit interior cavity 558 (shown in FIG. 7). The electric lead occupies only some of the volume of center cavity 516. Sealing compound 524 is injected into center cavity 516 such that the remaining volume of center cavity 516 adjacent to each electric lead is substantially filled and such that center cavity 516 is substantially sealed. In some embodiments, insulating paper, such as insulating paper 322 (shown in FIG. 3), may be used on adapter 510 to create a second border of center cavity 516 opposite rear plate 518. Further, in other embodiments, sealing compound 524 may be injected prior to coupling adapter 510 to electric motor stator or prior to coupling adapter 510 to conduit enclosure 550.

Figure 9:
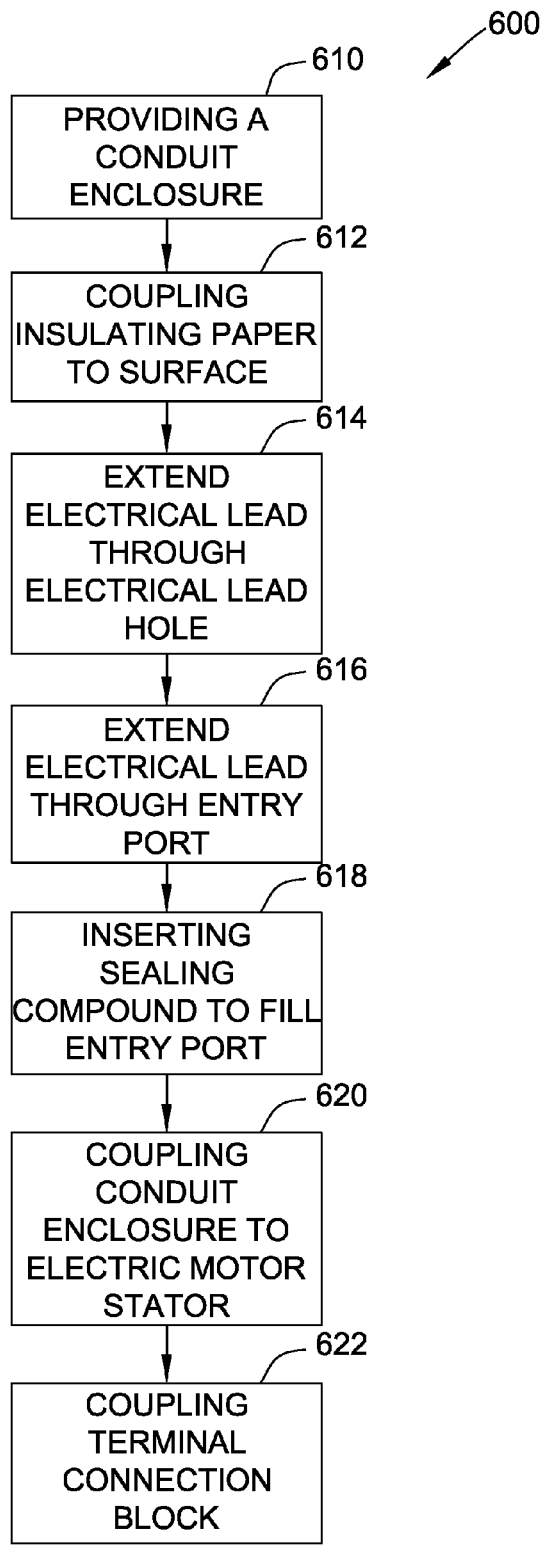
FIG. 9 is a block diagram of an exemplary method that may be implemented to couple conduit enclosures, such as the conduit enclosures shown in FIGS. 1-5, to an electrical motor stator.

FIG. 9 is a block diagram of an exemplary method 600 that may be implemented to couple conduit enclosures, such as conduit enclosures 202 (shown in FIGS. 1-5), to an electrical motor stator (not shown). Initially, a conduit enclosure 202, such as enclosure 202 (shown in FIG. 1), is provided 610. In the exemplary embodiment, insulating paper 322 (shown in FIG. 3) is coupled 612 to conduit enclosure 202, wherein at least one electrical lead (not shown) is extended 614 through electrical lead hole 324 (shown in FIG. 3), and extended 616 through entry port 214 (shown in FIG. 3) into cavity 212 (shown in FIG. 1).

Because the electrical lead only occupies some of the volume defined within entry port 214, sealing compound (not shown) is then inserted 618 into entry port 214 to fill at least a portion of the remaining volume not occupied by the electrical lead such that a seal is created. In the exemplary embodiment, sealing compound is coupled with entry port 214 to fill substantially all of the remaining volume. Conduit enclosure 202 is then coupled 620 to the motor stator. In the exemplary embodiment, a terminal connection block 216 (shown in FIG. 2) is coupled 622 to conduit enclosure 202.

Figure 10:
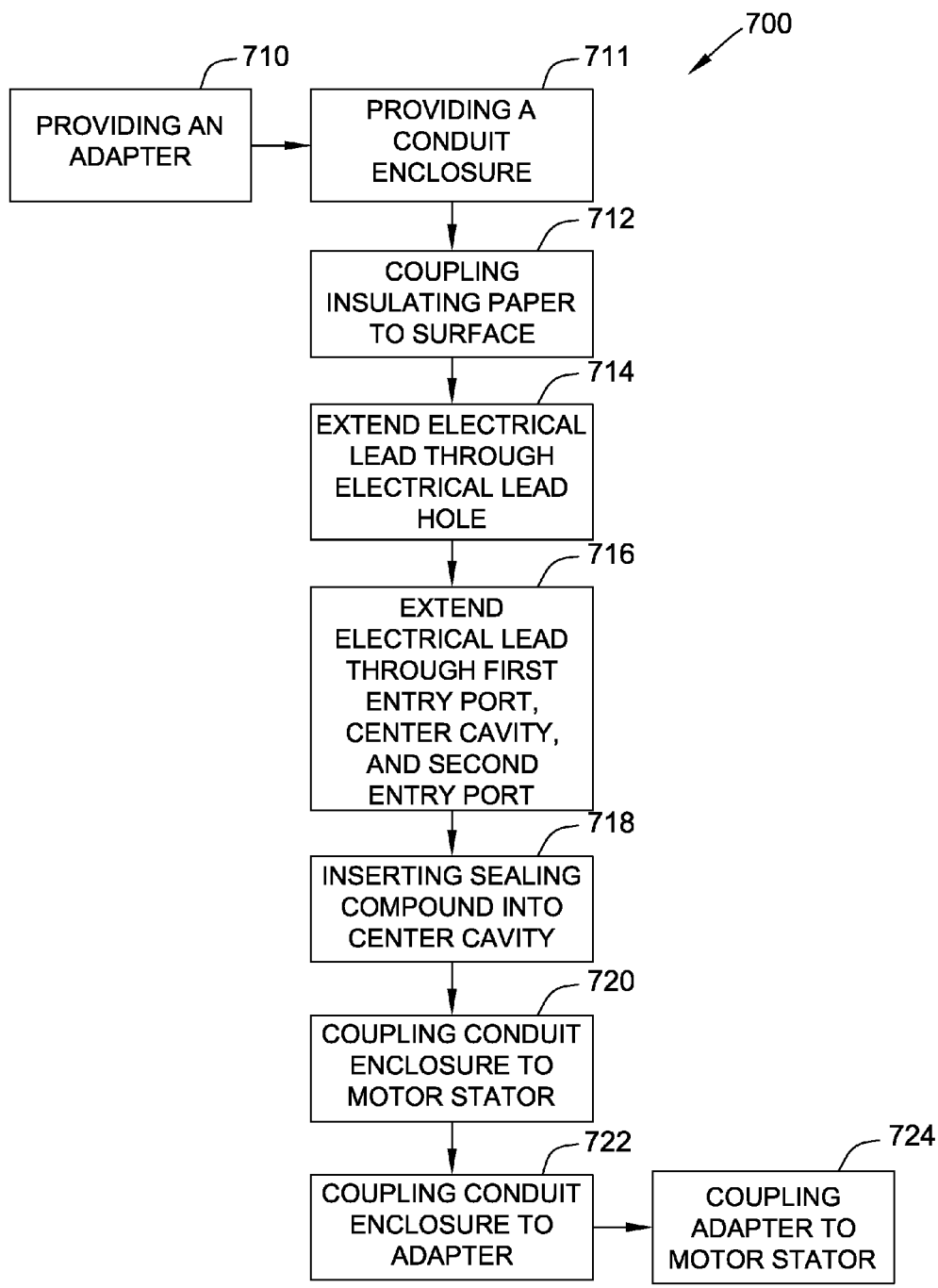
FIG. 10 is a block diagram of an exemplary method that may be implemented to attach the adapter shown in FIG. 6 and the conduit enclosure shown in FIG. 7 to an electric motor stator.

FIG. 10 is a block diagram of an exemplary method 700 of coupling an adapter, such as adapter 510 (shown in FIG. 6), and a conduit enclosure, such as conduit enclosure 550 (shown in FIG. 7), to an electric motor stator (not shown). In the exemplary embodiment, initially an adapter 510 is provided 710 that includes an outer region 514 (shown in FIG. 6) and a center region 512 (shown in FIG. 6), wherein the center region 512 includes a center cavity 516 (shown in FIG. 6).

Also, in the exemplary embodiment, a conduit enclosure 550 (shown in FIG. 7) is provided 711 that includes a base member 204 (shown in FIG. 7) that includes at least one entry port 560 (shown in FIG. 7). In the exemplary embodiment, insulating paper 322 (shown in FIG. 3) is coupled 712 to conduit enclosure 550, as described above, with at least one electrical lead (not shown) extended 714 through an electrical lead hole, such as electrical lead hole 324 (shown in FIG. 3).

Further, in the exemplary embodiment, the electrical lead is extended 716 through entry port 520, through center cavity 516, through enclosure entry port 560, and into enclosure interior cavity 558. Because the electrical lead occupies some of the volume of center cavity 516, sealing compound is then inserted 718 into center cavity 516 to fill at least a portion of the remaining volume of center cavity 516 not occupied by the electrical lead, and to form a seal between the electric motor stator and enclosure interior cavity 558. In some embodiments, sealing compound is inserted 781 to fill substantially all of the remaining volume of center cavity 516 not occupied by the electrical lead.

Moreover, in the exemplary embodiment, conduit enclosure 550 is coupled 720 to the motor stator. In the exemplary embodiment, conduit enclosure 550 is coupled 722 to adapter 510, and adapter 510 is then coupled 724 to the motor stator. Alternatively, any order and arrangement of coupling that enables adapter 510 and conduit enclosure 550 to function as described herein may be used. Further, any order of inserting 718, sealing, and coupling 720, 722, 724 that enables adapter 510 and conduit enclosure 550 to function as described herein may be used.

FIG. 11 is a front view of a portion of an example stator enclosure 800 to which the conduit enclosures described herein may be coupled. Stator enclosure 800 defines an enclosure opening 804 through which electric leads 806 from an electric motor stator extend.

The above-described systems and methods provide a way to sealably couple a conduit box to an explosion-proof electric motor stator in a cost-effective and reliable manner. The embodiments described herein facilitate eliminating the need to apply sealing compound within the motor stator in that sealing compound is only applied within the conduit box. By applying sealing compound only within the conduit box, the risks of sealing compound failing within the motor stator are facilitated to be reduced or eliminated. As such, the sealing compound described herein facilitates extending the useful life of the conduit box. Moreover, an amount of sealing compound required for the assembly is reduced such that assembly is easier and more reliable as compared to known methods. Using less sealing compound also facilitates reducing the necessity of a molding structure to hold the sealing compound in place while it cures, and thus facilitates reducing assembly costs and manpower requirements.

An exemplary technical effect of the methods, systems, and apparatus described herein includes at least one of: (a) eliminating the need to apply sealing compound within the motor stator; (b) eliminating the risk of destroying the motor stator during application; (c) extending the useful life of the conduit box and the motor stator; (d) reducing the amount of sealing compound required for assembly; (e) reducing the necessity of a molding structure within the motor stator during assembly; (f) reducing costs and manpower requirements for assembly.

Exemplary embodiments of systems and methods for seal a conduit box coupled to an explosion-proof electric motor stator are described above in detail. The systems and methods described herein are not limited to the specific embodiments described herein, but rather, components of systems and/or steps of the methods may be utilized independently and separately from other components and/or steps described herein. For example, the methods may also be used in combination with other systems requiring concept extraction systems and methods, and are not limited to practice with only the sealing systems and methods as described herein. Rather, the exemplary embodiments can be implemented and utilized in connection with many other sealing applications.

Although specific features of various embodiments may be shown in some drawings and not in others, this is for convenience only. In accordance with the principles of the systems and methods described herein, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An enclosure system comprising:
   a stator enclosure defining a first enclosure opening;
   a conduit enclosure coupled to said stator enclosure, said conduit enclosure comprising at least one side wall, a rear wall coupled to said side wall, an interior cavity, and a support feature, said rear wall defining a first entry port having a first volume, said first entry port comprising two semi-circular voids, said support feature comprising a support bar coupled to said rear wall and extending across said first entry port, said support bar disposed between and defining said two semi-circular voids;
   at least one electrical lead extending from said stator enclosure through said first enclosure opening, through said first entry port, and into said interior cavity, said at least one electrical lead occupying a portion of said first volume and leaving a remaining volume; and
   sealing compound coupled with said first entry port such that substantially all of the remaining volume is occupied, wherein said support feature mechanically supports said sealing compound to withstand pressure from an internal explosion within at least one of said conduit enclosure and said stator enclosure.

2. The enclosure system of claim 1, wherein said first entry port comprises a substantially cylindrical shape.

3. The enclosure system of claim 1, wherein said first entry port is one of a plurality of entry ports defined by said rear wall, said plurality of entry ports spaced circumferentially about a center of said rear wall.

4. The enclosure system of claim 1, further comprising insulating paper coupled to said rear wall, said insulating paper comprising at least one electrical lead hole defined therein, said insulating paper oriented such that said electrical lead hole is substantially concentrically aligned with said first entry port.

5. The enclosure system of claim 1, wherein said conduit enclosure further comprises:
   a mounting frame comprising:
      a first support and a second support coupled to said rear wall; and
      a base platform coupled to said first support and to said second support, wherein said base platform, said first support, said second support, said rear wall, and said first entry port define a channel having a channel volume, said at least one electrical lead extends through said channel, said sealing compound substantially seals said electric lead within said channel.

6. The enclosure system of claim 5, wherein said conduit enclosure further comprises a terminal connection block coupled to said base platform, said terminal connection block comprising at least one terminal.

7. The enclosure system of claim 1, wherein said rear wall further comprises a first area having a first thickness and a second area having a second thickness, wherein said second thickness is thicker than said first thickness, and wherein said entry port is defined within said second area.

8. A method of coupling a conduit enclosure to a stator enclosure, the method comprising:
providing the conduit enclosure, the conduit enclosure including a terminal connection block, an interior cavity, at least one side wall, a rear wall coupled to the at least one side wall, and a support feature, the rear wall defining an entry port having a first volume, the first entry fort including two semi-circular voids, the support feature including a support bar coupled to the rear wall and extending across the first entry port, the support bar disposed between and defining the two semi-circular voids;
extending at least one electrical lead from the stator enclosure through the entry port into the interior cavity, the at least one electrical lead occupying a portion of the first volume and leaving a remaining volume;
coupling sealing compound with the entry port such that the sealing compound substantially fills the remaining volume and the support feature mechanically supports the sealing compound to withstand pressure from an internal explosion within at least one of the conduit enclosure and the stator enclosure; and
coupling the conduit enclosure to the stator enclosure.

9. The method in accordance with claim 8, further comprising:
coupling insulating paper to the rear wall, the insulating paper comprising at least one electric lead hole defined therein, the insulating paper oriented such that the electrical lead hole is substantially concentrically aligned with the first entry port; and
extending the at least one electrical lead through the at least one electrical lead hole.

10. The method in accordance with claim 8, wherein the conduit enclosure further includes a mounting frame comprising a base platform and two supports coupled to the rear wall, the base platform having a rear-facing surface, the two supports coupled to the rear-facing surface and the rear wall, wherein the rear-facing surface, the first support, the second support, the rear wall, and the first entry port define a channel having a channel volume, the support feature including the rear-facing surface, said method further comprising:
extending the at least one electrical lead through the channel, the at least one electrical lead occupying some of the channel volume and leaving a remaining channel volume; and
coupling sealing compound with the channel such that the sealing compound fills a portion of the remaining channel volume.

11. The method in accordance with claim 10, wherein coupling sealing compound includes coupling the sealing compound such that the sealing compound substantially fills the remaining channel volume.

12. The method in accordance with claim 8, further comprising mounting the terminal connection block to an inner-facing surface of the base platform.

13. An enclosure system comprising:
a stator enclosure defining a first enclosure opening;
a conduit enclosure coupled to said stator enclosure, said conduit enclosure comprising:
a base member comprising an interior cavity, at least one side wall, and a rear wall coupled to said at least one side wall, said rear wall defining a first entry port;
a mounting frame comprising:
a first support and a second support each coupled to said rear wall and extending to said side wall; and
a base platform coupled to said first support and said second support, said base platform having an inner-facing surface and a rear-facing surface, wherein said rear-facing surface, said first support, said second support, said rear wall, and said first entry port define a channel having a channel volume; and
a terminal connection block coupled to said mounting frame and comprising at least one terminal;
at least one electrical lead extending from said stator enclosure through said first entry port, through said channel, and into said interior cavity, said at least one electrical lead occupying some of said channel volume and leaving a remaining channel volume; and
sealing compound coupled with said channel such that the sealing compound fills a portion of said remaining channel volume.

14. The enclosure system of claim 13, further comprising insulating paper coupled to said rear wall, said insulating paper comprising at least one electrical lead hole defined therein, said insulating paper oriented such that said electrical lead hole is substantially concentrically aligned with said first entry port, wherein said at least one electrical lead extends through said at least one electrical lead hole.

15. The enclosure system of claim 13, wherein said rear wall comprises a first area having a first thickness and a second area having a second thickness, wherein said second thickness is thicker than said first thickness, and wherein said entry port is defined within said second area.

16. The enclosure system of claim 13, wherein said mounting frame further comprises a lateral support.

17. The enclosure system of claim 16, wherein said lateral support and said rear facing surface define a curved transition surface.

* * * * *